United States Patent [19]

Mathieu et al.

[11] Patent Number: 5,049,042

[45] Date of Patent: Sep. 17, 1991

[54] ANTI-RETURN SAFETY APPARATUS

[75] Inventors: Luc Mathieu; Jean-Marc Paquet, both of Annecy, France

[73] Assignee: Alcatel CIT, Paris, France

[21] Appl. No.: 574,723

[22] Filed: Aug. 30, 1990

[30] Foreign Application Priority Data

Sep. 1, 1989 [FR] France ............................ 89 11486

[51] Int. Cl.$^5$ .......................................... F04B 49/00
[52] U.S. Cl. ..................................... 417/295; 251/5; 251/30.05; 137/565
[58] Field of Search ................ 417/295; 137/488, 565; 251/5, 30.05

[56]        References Cited
       U.S. PATENT DOCUMENTS

| | | | |
|---|---|---|---|
| 3,838,704 | 10/1974 | Johnson | 251/5 X |
| 4,135,550 | 1/1979 | Andersson | 137/295 X |
| 4,138,087 | 2/1979 | Kruse | 251/5 |
| 4,573,491 | 3/1986 | Arens | 137/486 X |
| 4,645,174 | 2/1987 | Hicks | 251/5 |

FOREIGN PATENT DOCUMENTS 1595857 7/1970 France .
2458013 12/1980 France .

*Primary Examiner*—Alan Cohan
*Attorney, Agent, or Firm*—Sughrue, Mion, Zinn, Macpeak & Seas

[57]        ABSTRACT

An anti-return safety apparatus for an installation comprising a vacuum vessel connected to a vacuum pump having an oil seal, wherein the apparatus comprises a valve constituted by a rigid tube having a flexible tube situated therein with the two ends of the flexible tube being fixed in sealed manner to the ends of the rigid tube, a control orifice being provided through the wall of the rigid tube in the vicinity of the middle thereof, the valve being connected between the vessel and the suction inlet to the pump, and in that a slide valve suitable for establishing two different communication paths is provided suitable for establishing a connection between a common outlet C and one or other of two distinct inlets a, and b, the common outlet C being connected to the control orifice of the valve having the flexible tube, the inlet a being connected to the suction inlet of the pump, and the inlet b being opened to atmospheric pressure, the slide valve being electromagnetically controlled by a coil, itself controlled by a relay which is actuated when the motor driving the pump is connected to a power supply voltage, and which is deactivated when the motor is disconnected from the power supply voltage, the slide valve providing communication between its common outlet C and its inlet a so long as the coil is powered, and between its common outlet C and its inlet b connected to the atmosphere whenever the coil is not powered.

2 Claims, 2 Drawing Sheets

ANTI-RETURN SAFETY APPARATUS

BACKGROUND OF THE INVENTION

The present invention provides an anti-return safety apparatus for an installation comprising a vacuum vessel connected to a vacuum pump having an oil seal.

SUMMARY OF THE INVENTION

According to the invention, the apparatus comprises a valve constituted by a rigid tube having a flexible tube situated therein with the two ends of the flexible tube being fixed in sealed manner to the ends of the rigid tube, a control orifice being provided through the wall of the rigid tube in the vicinity of the middle thereof, said valve being connected between the vessel and the suction inlet to said pump, and in that a slide valve suitable for establishing two different communication paths is provided suitable for establishing a connection between a common outlet C and one or other of two distinct inlets a, and b, said common outlet C being connected to the control orifice of said valve having the flexible tube, the inlet a being connected to the suction inlet of said pump, and the inlet b being opened to atmospheric pressure, said slide valve being electromagnetically controlled by a coil, itself controlled by a relay which is actuated when the motor driving said pump is connected to a power supply voltage, and which is deactivated when said motor is disconnected from the power supply voltage, the slide valve providing communication between its common outlet C and its inlet a so long as said coil is powered, and between its common outlet C and its inlet b connected to the atmosphere whenever said coil is not powered.

Advantageously, a core is disposed inside the flexible tube of said valve, with the section of said core being smaller than the internal section of the tube when the tube is in the rest position. This disposition provides good obstruction of the flexible tube against the core rather than against itself, since when there is no core it is difficult to obstruct the passage completely.

BRIEF DESCRIPTION OF THE DRAWINGS

Embodiments of the invention are described by way of example with reference to the accompanying drawings, in which.

DETAILED DESCRIPTION

Before describing the anti-return safety apparatus, a valve 16 used in this apparatus is described with reference to FIG. 2.

Figure 2:
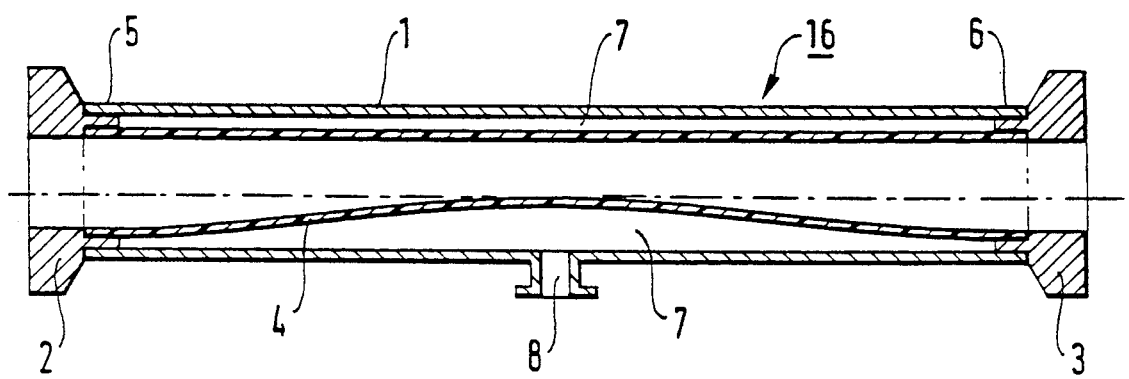
FIG. 2 is a view showing the valve used in the FIG. 1 apparatus.

Thus, with reference to FIG. 2, the valve 16 comprises a rigid tube 1 provided with two connection endpieces 2 and 3. A flexible tube 4 is situated inside the rigid tube and the two ends 5 and 6 of the flexible tube are connected in sealed manner to the ends of the rigid tube 1. The central portion of the flexible tube 4 is free, such that empty space 7 exists between the rigid tube and the flexible tube. A control orifice 8 is provided through the wall of the rigid tube in the vicinity of its middle. When the empty space 7 is subjected via the orifice 8 to a pressure which is greater to that inside the flexible tube 4, then the valve is closed by the flexible tube constricting. When the pressure inside the empty space 7 is equal to or less than the pressure inside the flexible tube, then its elasticity keeps the flexible tube open.

Such a valve has a through passage which is direct and therefore has maximum conductance.

Figure 3:
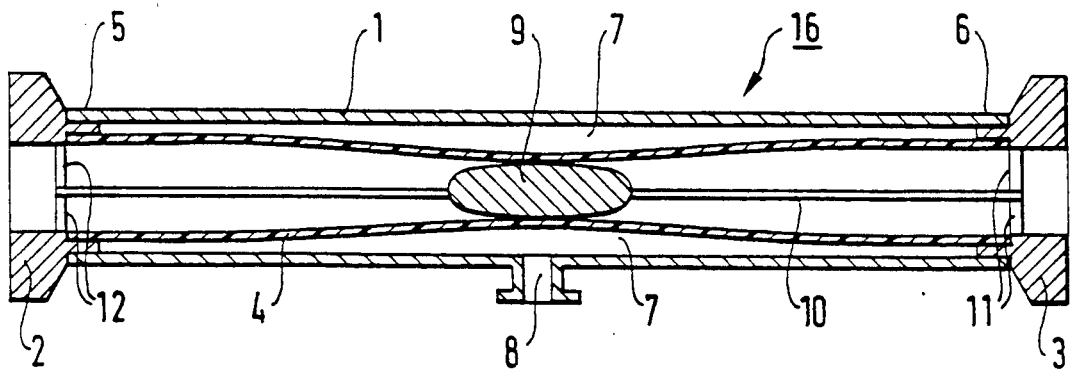
FIG. 3 shows a variant of the valve shown in FIG. 2 and also suitable for use in the apparatus of FIG. 1.

In the variant shown in FIG. 3, a core 9 is disposed inside the flexible tube 4. In this manner, when the valve is closed, the flexible tube 4 does not press against itself but presses against the core, thereby making it easier to close it fully.

In the case shown in FIG. 3, the core 9 is held by a shaft 10 which is in turn fixed to the ends 2 and 3 e.g. by means of spokes such as 11 and 12.

Figure 1:
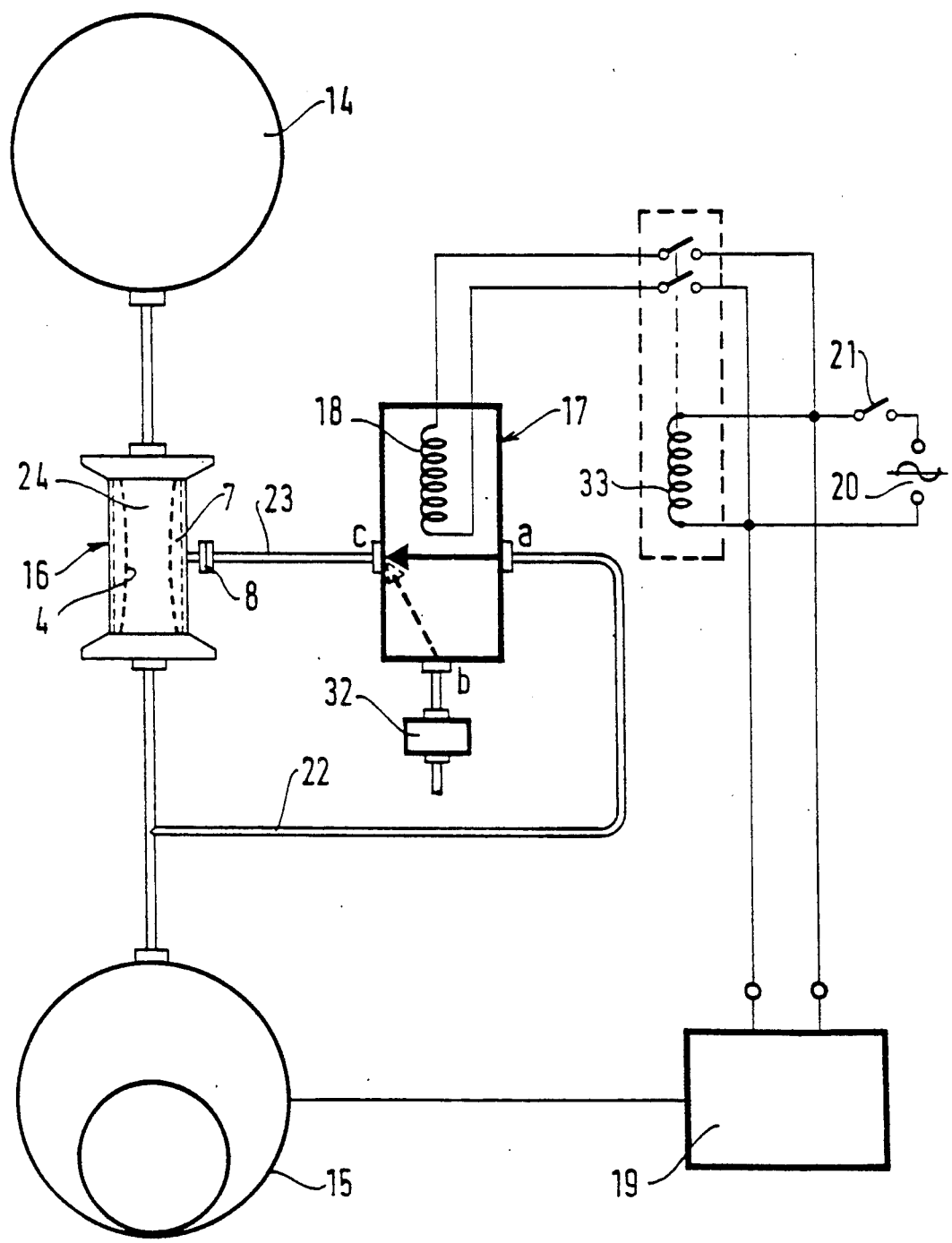
FIG. 1 shows a pumping installation provided with an anti-return safety apparatus of the invention.

The anti-return safety apparatus of the invention is now described with reference to FIG. 1.

In this figure, an evacuated vessel 14 is connected to a vacuum pump 15 having an oil seal.

In such an installation, it is known that it is necessary to take precautions to prevent the vessel being polluted by oil rising from the pump, particularly if there is a power failure.

One known apparatus uses an angle valve with a bell which closes when power is interrupted, but such a solution suffers from the drawback of reduced conductance and of being suitable for use over certain pressure ranges only.

In accordance with the invention, a valve is used as shown in FIG. 2 or as shown in FIG. 3, where the valve has a small section core. Thus, such a valve as shown diagrammatically at 16 is interposed between the vessel 14 and the suction inlet to the pump 15.

The valve 16 is controlled by its control orifice 8 connected via a duct 23 to the outlet C of an electrically controlled slide valve 17 having a common outlet C and two inlets a and b, and suitable for establishing communication either between a and C or else between b and C. Control is electromagnetic with return provided by a return spring.

When electromagnetic control is applied, communication is established between a and C as shown by the heavy continuous line, and when the coil 18 is unpowered, the return spring ensures that communication is established as shown by the dashed line between b and C.

The inlet a is connected to the suction inlet of the pump 15 via a duct 22, while the inlet b is connected via a filter 32 to the atmosphere or to a gas delivery point (e.g. for delivering an inert gas), and the faster the valve 16 closes, the higher the pressure applied to inlet b. 19 represents the drive motor for the pump 15 which is powered electrically from an electrical power supply 20. A switch 21 is disposed in the electrical circuit powering the motor 19, together with a relay 33 which controls the application of power to the coil 18 of the electrically controlled slide valve 17.

Operation is as follows: when the switch 21 is closed, as shown in FIG. 4, the pump 15 operates while the coil 18 is powered by the relay 33 so that the slide valve 17 provides communication between a and C. As a result, because of the connection via the duct 22, the pressure inside the empty space 17 of the valve 16 is the suction pressure of the pump 15, and so the valve 16 remains open.

Should the power supply to the pump 15 be interrupted, then the coil 18 is no longer powered by the relay 33 and the return spring (not shown) of the slide valve 17 establishes communication between b and C. The space 7 is then subjected to atmospheric pressure or to the pressure of the pressurized gas via the filter 32, while the inside 24 of the valve 16 is at low pressure. This causes the flexible tube 4 to compress, either onto itself if no core is present, or else onto the core if the valve has a core as shown in FIG. 3. This ensures that communication between the pump 15 and the vessel 14 is closed automatically in the event of electrical power being interrupted, thereby ensuring that no oil penetrates into the vessel 14.

We claim:

1. An anti-return safety apparatus for an installation comprising a vacuum vessel connected to a vacuum pump having an oil seal, wherein the apparatus comprises a valve constituted by a rigid tube having a flexible tube situated therein with the two ends of the flexible tube being fixed in sealed manner to the ends of the rigid tube, a control orifice being provided through the wall of the rigid tube in the vicinity of the middle thereof, said valve being connected between the vessel and the suction inlet to said pump, and in that a slide valve suitable for establishing two different communication paths is provided suitable for establishing a connection between a common outlet C and one or other of two distinct inlets a, and b, said common outlet C being connected to the control orifice of said valve having the flexible tube, the inlet a being connected to the suction inlet of said pump, and the inlet b being opened to atmospheric pressure, said slide valve being electromagnetically controlled by a coil, itself controlled by a relay which is actuated when the motor driving said pump is connected to a power supply voltage, and which is deactivated when said motor is disconnected from the power supply voltage, the slide valve providing communication between its common outlet C and its inlet a so long as said coil is powered, and between its common outlet C and its inlet b connected to the atmosphere whenever said coil is not powered.

2. A apparatus according to claim 1, wherein a core is disposed inside the flexible tube of said valve, with the section of said core being smaller than the internal section of the tube when the tube is in the rest position.

* * * * *